United States Patent
Ghezel-Ayagh

(10) Patent No.: US 9,812,723 B2
(45) Date of Patent: Nov. 7, 2017

(54) POWER PRODUCING GAS SEPARATION SYSTEM AND METHOD

(71) Applicant: FUELCELL ENERGY, INC., Danbury, CT (US)

(72) Inventor: Hossein Ghezel-Ayagh, New Milford, CT (US)

(73) Assignee: FUELCELL ENERGY, INC., Danbury, CT (US)

( * ) Notice: Subject to any disclaimer, the term of this patent is extended or adjusted under 35 U.S.C. 154(b) by 0 days.

(21) Appl. No.: 14/631,239

(22) Filed: Feb. 25, 2015

(65) Prior Publication Data

US 2016/0248110 A1 Aug. 25, 2016

(51) Int. Cl.
| | |
|---|---|
| *H01M 8/06* | (2016.01) |
| *H01M 8/0668* | (2016.01) |
| *H01M 8/04014* | (2016.01) |
| *H01M 8/14* | (2006.01) |

(52) U.S. Cl.
CPC ..... *H01M 8/0668* (2013.01); *H01M 8/04014* (2013.01); *H01M 2008/147* (2013.01); *H01M 2250/40* (2013.01); *Y02E 60/526* (2013.01); *Y02E 60/56* (2013.01)

(58) Field of Classification Search
CPC ................. H01M 8/06–8/0693; H01M 8/0668
USPC ................................................ 429/410, 412
See application file for complete search history.

(56) References Cited

U.S. PATENT DOCUMENTS

| | | | |
|---|---|---|---|
| 4,499,946 A | 2/1985 | Martin et al. | |
| 4,942,734 A * | 7/1990 | Markbreiter | C01B 31/20 60/39.182 |
| 5,232,793 A | 8/1993 | Miyauchi et al. | |
| 6,423,435 B1 | 7/2002 | Autenrieth et al. | |
| 7,396,603 B2 | 7/2008 | Farooque et al. | |
| 2004/0219400 A1 | 11/2004 | Al-Hallaj et al. | |
| 2005/0271914 A1 | 12/2005 | Farooque et al. | |
| 2007/0059415 A1 | 3/2007 | Sundaram et al. | |

(Continued)

FOREIGN PATENT DOCUMENTS

WO WO 2012023925 A1 * 2/2012 ........ H01M 8/04029

OTHER PUBLICATIONS

International Search Report and Written Opinion for co-pending application PCT/IB2016/050940 dated May 23, 2016 (17 pages).

*Primary Examiner* — Jonathan G Leong
(74) *Attorney, Agent, or Firm* — Foley & Lardner LLP

(57) ABSTRACT

A power producing system adapted to be integrated with a flue gas generating assembly, the flue gas generating assembly including one or more of a fossil fueled installation, a fossil fueled facility, a fossil fueled device, a fossil fueled power plant, a boiler, a combustor, a furnace and a kiln in a cement factory, and the power producing system utilizing flue gas containing carbon dioxide and oxygen output by the flue gas generating assembly and comprising: a fuel cell comprising an anode section and a cathode section, wherein inlet oxidant gas to the cathode section of the fuel cell contains the flue gas output from the flue gas generating assembly; and a gas separation assembly receiving anode exhaust output from the anode section of the fuel cell and including a chiller assembly for cooling the anode exhaust to a predetermined temperature so as to liquefy carbon dioxide in the anode exhaust, wherein waste heat produced by the fuel cell is utilized to drive the chiller assembly.

32 Claims, 4 Drawing Sheets

(56) References Cited

U.S. PATENT DOCUMENTS

2010/0215566 A1 8/2010 Lourenco et al.
2010/0279181 A1 11/2010 Adams et al.
2011/0219948 A1 9/2011 McCutchen
2014/0329160 A1 11/2014 Ramaswamy et al.

* cited by examiner

POWER PRODUCING GAS SEPARATION SYSTEM AND METHOD

BACKGROUND OF THE INVENTION

This invention relates to fuel cell power production systems and, in particular, to a fuel cell power producing gas separation system and method.

A fuel cell is a device which directly converts chemical energy stored in a fuel into electrical energy through electrochemical reactions. Generally, a fuel cell comprises an anode and a cathode separated by an electrolyte, which serves to conduct electrically charged ions. Molten Carbonate Fuel Cells (MCFCs) operate by passing a reactant fuel gas through the anode, while oxidizing gas, such as carbon dioxide and oxygen, is passed through the cathode.

Combustion-based power plants produce energy by combusting flammable hydrocarbon based fuels including coal, natural gas, biogas, and syngas. As a result of the combustion process, combustion-based power plants generate flue gas, which is often disposed of by atmospheric emissions. Such emissions, however, are harmful to the environment because they contain carbon dioxide which contributes to global climate change.

Accordingly, a number of approaches have been used to control or limit carbon dioxide emissions from combustion-based power plants. However, separating the carbon dioxide from the post-combustion flue gas is not cost effective because of the significant loss of energy (power and/or heat) as the result of application of carbon dioxide capture systems.

A system is disclosed in U.S. Pat. No. 5,232,793 in which carbon dioxide emissions in the flue gas of a fossil fuel power plant are reduced using a carbonate fuel cell in tandem with the power plant. In this system, the flue gas is added to an oxidant supply and the combined gas is used as the feed gas for the cathode of the molten carbonate fuel cell. The electrochemical reaction in the fuel cell then results in the carbon dioxide in the feed gas being transferred from the cathode to the anode of the fuel cell. The anode exhaust gas thus becomes concentrated with carbon dioxide gas. This permits the carbon dioxide gas to be separated from the flue gas. The system of the '793 patent uses an externally reforming fuel cell system. In this system, the anode exhaust gas still has substantial amount of hydrogen in addition to quantities of carbon monoxide, methane and water. A great portion of the water can be condensed, however, the '793 patent does not offer a cost effective method for separating the remaining hydrogen, methane and carbon monoxide from the anode exhaust. Purification of carbon dioxide in the anode exhaust stream by removing hydrogen, carbon monoxide and methane is required prior to sequestration or conversion of carbon dioxide to a useful form.

An integrated power production system is disclosed by U.S. Pat. No. 7,396,603 in which a fossil fuel power plant for processing fossil based fuel is arranged in tandem with a carbonate fuel cell having an anode and a cathode. In the system of the '603 patent, the flue gas of the power plant serves as the inlet gas for the cathode section of the fuel cell. In addition, the system of '603 uses internal reforming carbonate fuel cells, which reduces the amount of methane within the anode exhaust to a negligible amount. However, the anode exhaust gas leaving the anode section of the fuel cell contains substantial amount of hydrogen, carbon monoxide and water impurities. The anode exhaust is subjected to processing including purification and capturing of the carbon dioxide in the exhaust gas using a carbon dioxide separator. However, the integrated power production system of the '603 patent does not recover heat or useful gases present in the flue gas, and does not disclose the details of $CO_2$ separation from the anode exhaust.

SUMMARY OF THE INVENTION

The present invention provides an integrated power production system, or a fuel cell system that can be integrated with a fossil fueled device, facility or installation including a power plant, boiler, or any type of combustor such as kilns in a cement factory and coke ovens in the steel industry, and includes efficient separation of gases, and in particular of carbon dioxide, in fuel cell exhaust. The present invention also enables separation of high purity carbon dioxide from the fuel cell exhaust so that the separated carbon dioxide may be utilized in other industries.

In accordance with the present invention, a power producing system is provided and is adapted to be integrated with a fossil fueled installation, facility or device and to utilize flue gas containing carbon dioxide and oxygen output by the fossil fueled installation, facility or device. The power producing system comprises: a fuel cell comprising an anode section and a cathode section, wherein inlet oxidant gas to the cathode section of the fuel cell contains the flue gas output by the fossil fueled installation, facility or device; and a gas separation assembly receiving anode exhaust output from the anode section of the fuel cell and including a chiller assembly for cooling the anode exhaust to a predetermined temperature so as to liquefy carbon dioxide in the anode exhaust, wherein waste heat produced by the fuel cell is utilized to drive the chiller assembly. In some embodiments, the inlet oxidant gas supplied to the cathode section of the fuel cell contains exclusively all or part of the flue gas output by the fossil fueled installation, facility or device. In certain embodiments, the chiller assembly comprises one or more absorption chillers, while in other embodiments, the chiller assembly comprises one or more adsorption chillers. The gas separation assembly recovers waste heat from cathode exhaust output by the cathode section of the fuel cell and utilizes at least a portion of the recovered waste heat to drive the chiller assembly.

In some embodiments, the gas separation assembly further includes a water removal assembly for separating water from the anode exhaust and for outputting water-separated anode exhaust, and the chiller assembly receives the water-separated anode exhaust. The gas separation assembly further includes a compressor for compressing the water-separated anode exhaust output from the water removal assembly prior to the water-separated anode exhaust being conveyed to the chiller assembly. In some embodiments, the compressor compresses the anode exhaust to at least 200 psi and wherein the chiller assembly chills the anode exhaust to about −40° C. or warmer temperature. The higher the pressure of the said compressor, the warmer the temperature of the chiller to be employed. The design points are the result of trade-off studies between cooler chillers with larger duty and larger compressors with higher parasitic power consumption. Moreover, the gas separation assembly further includes a gas separation device receiving chilled anode exhaust from the chiller assembly and for separating liquefied carbon dioxide from residual fuel gas in the chilled anode exhaust. In some embodiments, the gas separation assembly further includes a shift reactor for converting carbon monoxide in the anode exhaust to carbon dioxide prior to the anode exhaust being conveyed to the water removal assembly.

In some embodiments, the power producing system also includes an oxidizer receiving flue gas output by the fossil fueled installation, facility or device and residual fuel gas separated by the gas separation device and oxidizing the residual fuel to heat the flue gas, wherein the oxidizer outputs heated flue gas to the cathode section of the fuel cell. The power producing system also includes at least one heat exchanger for utilizing waste heat in the cathode exhaust for heating at least one of fuel gas to be input to the anode section and flue gas output by the fossil fueled installation, facility or device. In some embodiments, the fuel cell is an internal reforming Molten Carbonate Fuel Cell (MCFC), while in other embodiments the fuel cell is an external reforming MCFC.

A gas separation method for use in a power producing system and utilizing flue gas containing carbon dioxide and oxygen output from a fossil fueled installation, facility or device is also described. Moreover, an integrated power production system that includes a fossil fueled installation, facility or device and the power producing system described above is also provided. Moreover, a gas separation assembly for use in a fuel cell system integrated with a fossil fueled installation, facility or device is also described.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1A:
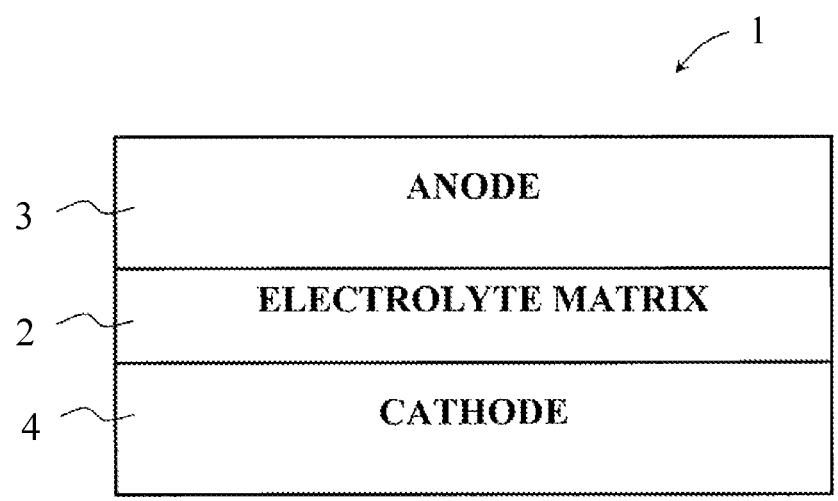
FIG. 1A shows a schematic of a fuel cell.

FIG. 1A shows schematic of a fuel cell 1. The fuel cell 1 comprises an electrolyte matrix 2, an anode 3, and a cathode 4. The anode 3 and the cathode 4 are separated from one another by the matrix 2. Flue gas from a combustion exhaust supply unit is fed to the cathode 4 as oxidant gas. In the fuel cell 1, fuel gas and oxidant gas undergo an electrochemical reaction in the presence of a carbonate electrolyte present in the pores of the electrolyte matrix 2. In the illustrative system disclosed below, the fuel cell 1 comprises a fuel cell stack assembly in which multiple individual fuel cells 1 are stacked and connected in series.

Figure 1B:
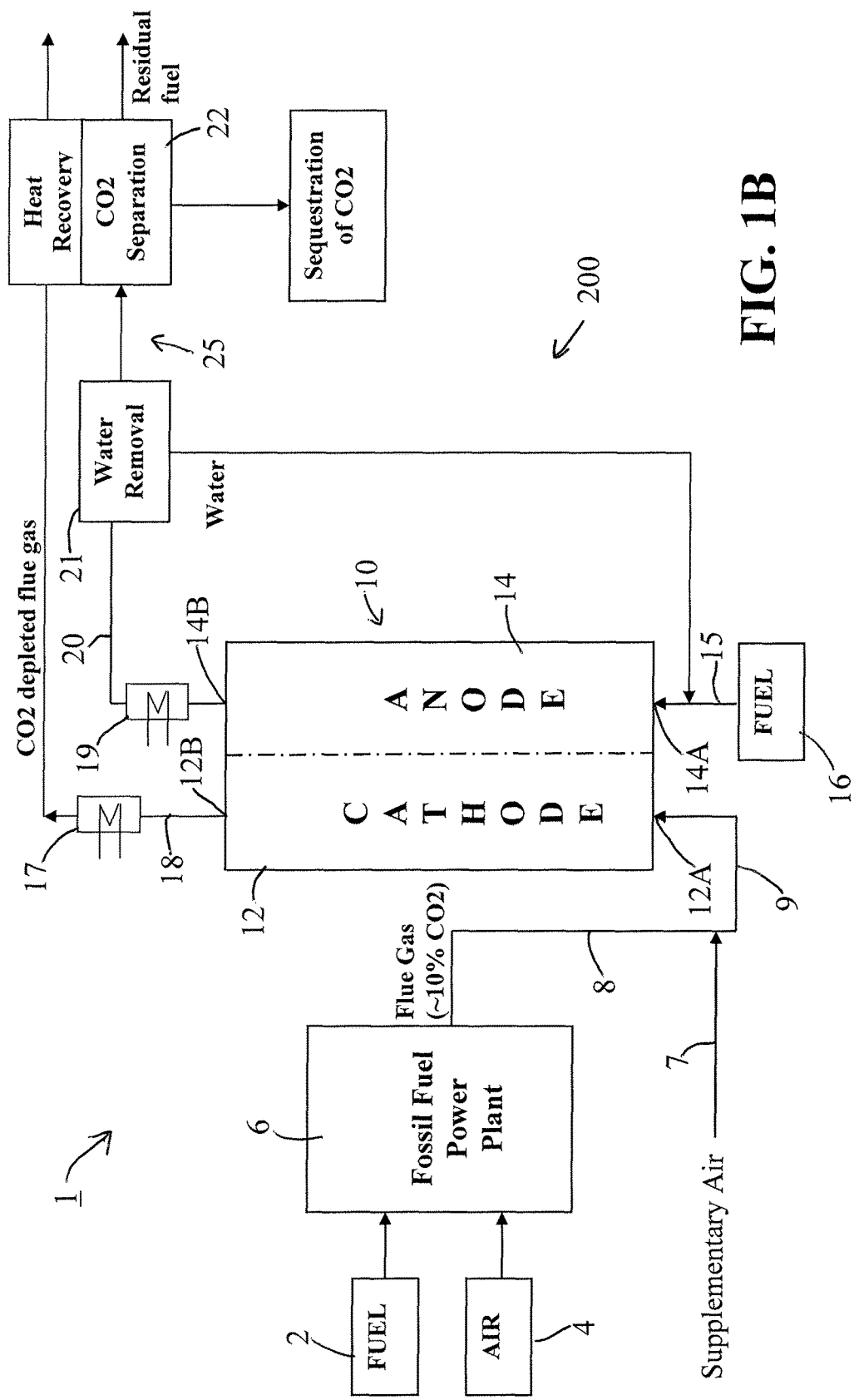
FIG. 1B shows an integrated power production system of the present invention.

FIG. 1B shows an integrated power production system 1 comprised of a flue gas generating assembly 6, which includes one or more of a fossil fueled installation, facility or device, a boiler, a combustor, a furnace and kiln in a cement factory (hereinafter "fossil fueled installation, facility or device"), and a power producing gas separation and carbon dioxide capture for sequestration system 200 that includes a carbonate fuel cell assembly 10 and a gas separation assembly 25 in accordance with the present invention. As shown, the carbonate fuel cell assembly 10 includes a cathode section 12 and an anode section 14, and in the present illustrative embodiment, the fuel cell assembly 10 is an internally reforming or a direct molten carbonate fuel cell assembly in which the fuel for the anode is internally reformed in the assembly. In other illustrative embodiments, an externally reforming carbonate fuel cell assembly can also be employed in which case a reformer would be used to reform the fuel prior to delivery to the fuel cell anode section.

As shown, the fossil fueled installation, facility or device 6 and the fuel cell assembly 10 of the power producing gas separation and sequestration system 200 are arranged in tandem such that the cathode section 12 of the assembly is supplied with the flue gas from the fossil fueled installation, facility or device. In the embodiment shown in FIG. 1B, the cathode section 12 is supplied exclusively with flue exhaust gas from the fossil fueled installation, facility or device. In particular, fossil fuel such as coal, natural gas or other hydrocarbon fuel is delivered to the fossil fueled installation, facility or device 6 from a fossil fuel supply 2 along with air delivered from an air supply 4. The fossil fuel and air undergo a combustion reaction in the fossil fueled installation, facility or device 6 producing power and resulting in an output flue gas exhaust. The flue gas exhaust typically comprises approximately 3-15% carbon dioxide, 10-20% water, and 5-15% oxygen, with the balance nitrogen. The exact amounts of these components will depend upon the type of fossil fuel and the amount of air from the air supply 4. The oxygen content can be varied by adjusting the air supply 4 or by addition of supplementary air 7 to the flue gas 8 before entering in the fuel cell cathode section 12. The purpose of the supplementary air to increase the oxygen portion of the combined stream 9, in case there is not sufficient oxygen in the flue gas 8 required for the fuel cell operation.

As shown, a line 9 couples a part or all of the flue exhaust gas to the inlet 12A of the cathode section 12 so that oxidant gas supply to the cathode inlet includes the flue gas exhaust. In the embodiment shown, the flue gas in combination with a possible supplementary air stream is the exclusive oxidant gas supply to the inlet 12A. At the same time, fuel from a supply 16, such as coal gas, natural gas or other hydrogen-containing fuel, is delivered over a line 15 to an inlet 14A of the anode section 14. In the fuel cell assembly 10, the oxidant gas in the cathode section 12 comprising flue gas exhaust and the reformed hydrogen in the anode section 14 undergo an electrochemical reaction to produce a power output. Also, this electrochemical reaction results in a substantial portion (approximately 65 to 85% or more) of the carbon dioxide in the flue gas being transferred from the cathode section to the anode section of the cell. More particularly, the carbon dioxide and oxygen in the flue gas react in the cathode section 12 of the fuel cell to produce carbonate ions which are carried to the anode section 14 of the cell through the fuel cell electrolyte. At the anode section 14, the carbonate ions are reduced with hydrogen from the fuel to produce water and carbon dioxide. The net result is the above-mentioned transfer of a substantial portion of the carbon dioxide in the flue gas from the cathode section to the anode section. Anode exhaust gas at the outlet 14B of the anode compartment of the fuel cell 10 is thus, high in concentration of carbon dioxide, thereby permitting the carbon dioxide gas to be more easily and efficiently captured and sequestered using the $CO_2$ sequestration system of the present invention.

In the embodiment shown in FIG. 1B, flue gas depleted of carbon dioxide exits the cathode section 12 through a cathode outlet 12B via a line 18, and anode exhaust gas containing predominantly carbon dioxide as well as unreacted hydrogen, carbon monoxide, water vapor and trace amounts of other gases exits the anode outlet 14B and is conveyed by line 20 to the gas separation assembly 25. As shown in FIG. 1B and as described in more detail below and shown in FIG. 2, the gas separation assembly 25 includes at least a water removal assembly 21 for recovering water from the anode exhaust and a carbon dioxide separation assembly 22 for separating carbon dioxide from the remaining anode exhaust. The carbon dioxide separation assembly 22 is described in more detail below with respect to FIG. 2. Moreover, because the cathode gas exits the fuel cell at high temperature, all or part of the sensible heat from this stream is recovered by one or more heat recovery units 17 and may be used for pre-heating gases incoming into the fuel cell assembly 10. In some embodiments, heat may be recovered from the anode exhaust gas exiting the fuel cell anode section prior to being conveyed to the gas separation assembly 25.

Figure 2:
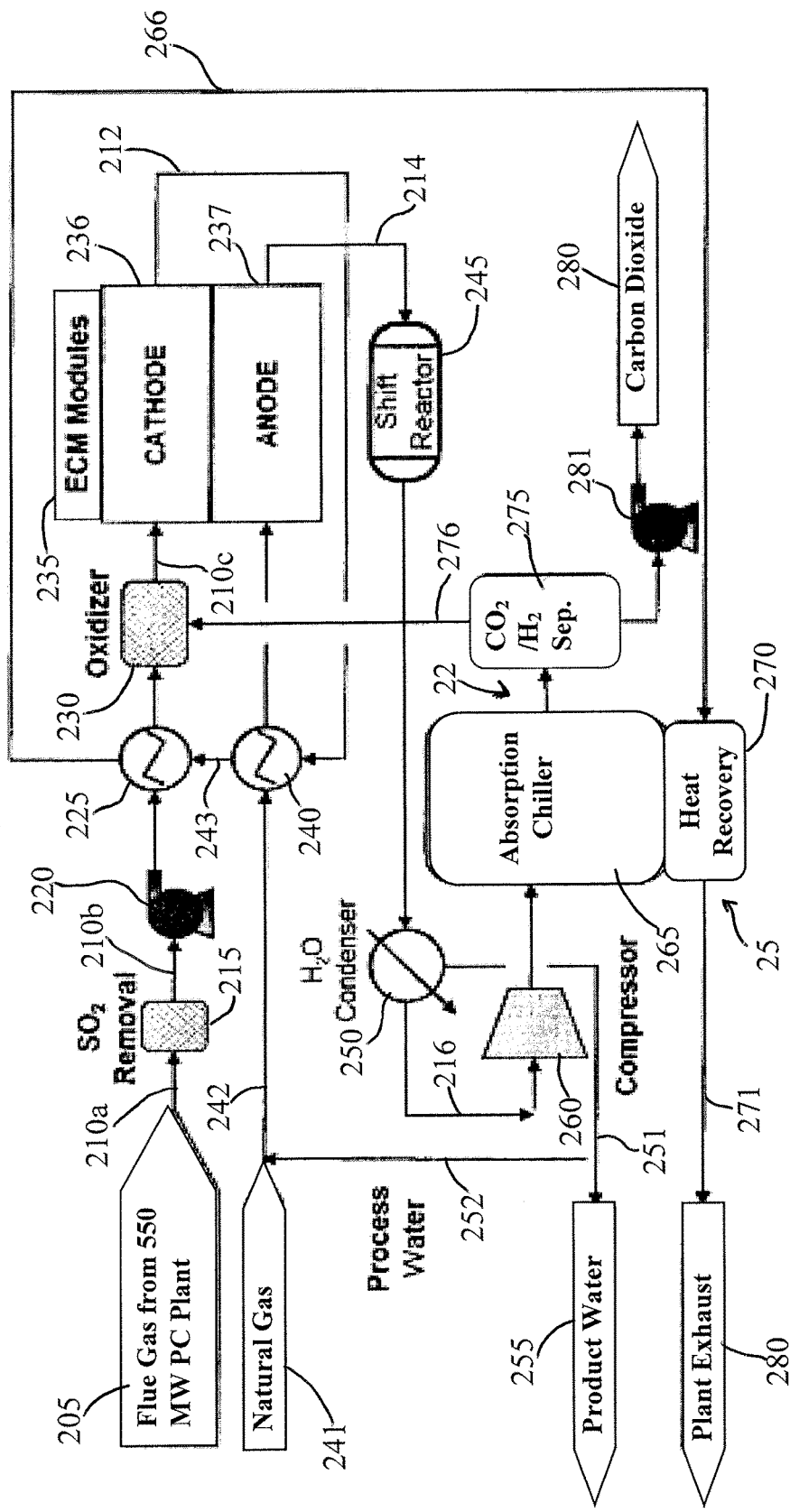
FIG. 2 shows a diagram of a power producing gas separation and sequestration system.

FIG. 2 shows in more detail the power producing gas separation and sequestration system 200 of the present invention. The system 200 receives, from a combustion exhaust supply 205, flue gas containing mainly carbon dioxide, water, oxygen and nitrogen, and produced from combustion of flammable hydrocarbons, including, for example, coal, natural gas, biogas, syngas, and other hydrocarbonaceous fuels such as ethanol, in a combustion-based power plant, a fossil fueled installation, facility or device or the like. The combustion exhaust supply 205 supplies the flue gas exhaust through a gas stream conduit 210a to a trace contaminant/pollutant gas removal device 215. The trace contaminant/pollutant gas removal device 215 removes combustion by-products including sulfur oxide gases, such as $SO_2$, mercury, particulates, and nitrogen oxide gases ($NO_x$). In the illustrative embodiment shown in FIG. 2, the by-product gas removal device 215 outputs cleaned flue gas to a flue gas blower 220 through the gas stream conduit 210b. The flue gas blower 220 boosts the pressure of the cleaned flue gas such that the flue gas is pushed through the system 200.

In the illustrative embodiment shown, the flue gas blower 220 outputs the flue gas to a first heat exchanger 225, which is configured to heat the flue gas to a temperature of approximately 500° C.-650° C. If necessary, in case the flue gas is hot, the first heat exchanger 225 may also remove heat from the flue gas and divert the heat for heat recovery. As shown in FIG. 2, the first heat exchanger 225 receives the cleansed flue gas from the combustion exhaust supply 205 through the gas stream conduit 210b and also receives cathode exhaust output from a cathode side 236 of the fuel cell 235. After the flue gas is heated to the desired temperature in the first heat exchanger 225, the heated flue gas is output to an oxidizer assembly including an oxidizer 230. The oxidizer 230 also receives gas containing fuel, such as a portion of the anode exhaust or all or a portion of residual fuel separated from the anode exhaust in a gas separation device 275 described herein below. In the oxidizer 230, fuel containing gas is oxidized in the presence of flue gas, thereby further heating of the flue gas. The oxidizer 230 outputs the further heated flue gas through the gas stream conduit 210c to the fuel cell 235.

The fuel cell 235 comprises the cathode section 236 and the anode section 237. As discussed above, in the illustrative embodiment of FIG. 2, the fuel cell 235 is an internal reforming Molten Carbonate Fuel Cell (MCFC). However, in other embodiments, the fuel cell may be an external reforming fuel cell, or may use both external and internal reforming, in which cases an external reformer is also provided to reform the fuel before it is conveyed to the anode section 237. The cathode section 236 is coupled to the combustion exhaust supply 205 via the gas stream conduits 210a-c and receives the flue gas from the combustion exhaust supply 205 through the gas stream conduits 210b-c after the flue gas has been processed in the by-product gas removal device 215 and heated in the first heat exchanger 225 and the oxidizer 230. In the present illustrative embodiment, the cathode section 236 receives exclusively the flue gas, or processed flue gas, provided from the combustion exhaust supply 205. However, in other embodiments, the flue gas or the processed flue gas may be mixed with air or oxidant gas from other sources.

After undergoing an electrochemical reaction in the fuel cell, the cathode section 236 outputs the cathode exhaust through a gas stream conduit 212 to a second heat exchanger 240 which also receives fuel, such as natural gas, from a fuel supply 241 through a fuel supply conduit 242. In the illustrative embodiment of FIG. 2, natural gas is used as fuel; however, the source of fuel may be other types of fuels including but not limited to coal-derived syngas, anaerobic digester gas, and renewable fuels such as ethanol or hydrogen. Also in other embodiments, the flue gas may need to be cleaned up from fuel cell-harmful contaminants such as sulfur-bearing species, before usage in the fuel cell. In the second heat exchanger 240, the received fuel is heated using waste heat from the cathode exhaust to a temperature of approximately 450° C.-650° C., and heated fuel is then conveyed from the second heat exchanger 240 to the anode section 237 of the fuel cell 235. The second heat exchanger also outputs cooled cathode exhaust which is then conveyed through the first heat exchanger 225 to pre-heat the cleaned flue gas.

As shown in FIG. 2, the anode section 237 receives pre-heated fuel, which is typically humidified by adding water via conduit 252, and after the gases undergo an electrochemical reaction in the fuel cell 235, the anode section 237 outputs anode exhaust to the gas separation assembly 25 via a conduit 214. In the embodiment of FIG. 2, the gas separation assembly 25 includes a shift reactor 245, a water removal assembly 250, a compressor 260 and a carbon dioxide separation assembly 22, including a chiller assembly 265 driven by waste heat of the fuel cell 235 and a flash drum 275 or another suitable gas-liquid separation device.

In the system of FIG. 2, the shift reactor 245 converts substantially all carbon monoxide present in the anode exhaust to carbon dioxide, according to the reaction:

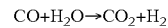

$$CO + H_2O \rightarrow CO_2 + H_2$$

so that anode exhaust output from the shift reactor 245 comprises substantially carbon dioxide, hydrogen, and water. The anode exhaust output from the shift reactor 245 is then conveyed to the water removal assembly 250, including a condenser or the like, where water present in the anode exhaust is separated from the remaining gases, such as carbon dioxide and hydrogen, through condensation. The water removal assembly 250 outputs condensed water through a water removal conduit 251 from which the condensed water is recycled back to the system 200 or output a product water collector 255 for use outside the system 200 and/or recycling back to the system. As shown in FIG. 2, all or a portion of the condensed water may be recycled for fuel humidification by routing the water to the fuel supply conduit 242 via the water recycling conduit 252. As also shown, the remaining portion of the condensed water is either output from the system 200 or collected in a product water collector 255 and may be recycled back to the system 200 when needed.

The condenser assembly 250 outputs water-separated anode exhaust through the gas stream conduit 216 to the compressor 260, which compresses the anode exhaust to a pressure of about 200 Pounds Per square Inch (psi) or higher. The higher the pressure of the said compressor, the higher the temperature that can be offered by the chiller. The design points are a trade-off between larger and more cooling chiller or higher compression power consumption. The compressor 260 outputs the compressed anode exhaust to the chiller assembly 265. The chiller assembly 265 includes one or more devices that use heat to drive cooling of the compressed water-separated anode exhaust so as to cause separation of the individual gases within the anode exhaust. As shown in FIG. 2, the chiller assembly 265 comprises one or more absorption chillers, i.e., one or more absorption refrigerators. In some embodiments, an assembly of a plurality of absorption chillers connected in series may be used, wherein each of the absorption chillers receives all or a portion of the compressed water-separated anode exhaust from the compressor 260. In other embodiments, one or more adsorption chillers may be used instead of the absorption chillers.

In the chiller assembly 265, water-separated compressed anode exhaust is cooled to a predetermined temperature while maintaining its compressed state. In particular, the anode exhaust is cooled to a temperature of about −40° C. or warmer, while maintaining the high pressure of the gas, i.e., at about 200 psi or higher. At this temperature and pressure, carbon dioxide, present in the anode exhaust is liquefied causing separation of the carbon dioxide from other gases, such as residual hydrogen fuel present in the anode exhaust gas. The chiller assembly 265 utilizes waste heat generated by the fuel cell 237 and recovered from fuel cell exhaust in a heat recovery assembly 270. Specifically, cathode exhaust is conveyed to the heat recovery assembly 270 via conduit 266 after being passed through the second heat exchanger 240 and through the first heat exchanger 225. The heat recovery assembly 270 recovers the remaining waste heat from the cathode exhaust and utilizes the recovered waste heat to drive the chiller assembly 265. After being conveyed through the heat recovery assembly 270, the cathode exhaust is removed from the system 200 and emitted to the atmosphere by a system exhaust duct 280 through an exhaust conduit 271.

The chiller assembly 265 outputs the cooled anode exhaust, in which carbon dioxide has been liquefied while the residual fuel is in gas state, to the gas-liquid separation device 275. The gas separation device 275 also called flash drum is a tank that separates the liquefied carbon dioxide from the residual fuel gas and outputs the separated nearly pure and liquefied carbon dioxide to a sequestration assembly 280 such as an underground storage. A pump 281 or the like may be used to facilitate the flow of separated and liquefied pure carbon dioxide from the gas separation device 275. For example the pump 281 may be utilized to increase the liquefied carbon dioxide pressure to >2200 psi in order to transform the carbon dioxide to a super-critical state to facilitate its long distance transportation to the 280 sequestration site. In some embodiments, the separated carbon dioxide is utilized by other processes and applications such as Enhanced Oil Recovery (EOR), production of chemicals, and used in the food industry. The gas separation assembly 275 also outputs the separated residual fuel gas, such as hydrogen, through a fuel gas recycling conduit 276. In the illustrative embodiment of FIG. 2, the fuel gas recycling conduit 276 is coupled to the oxidizer unit 230 so that separated residual fuel output is output from the gas separation device 275 to the oxidizer unit 230 for pre-heating of the flue gas. In other embodiments, the separated residual fuel gas may be utilized as a syngas byproduct in other processes including but not limited to refineries, combustion turbines, and other fuel cells, which are not contained within the system 200.

Figure 3:
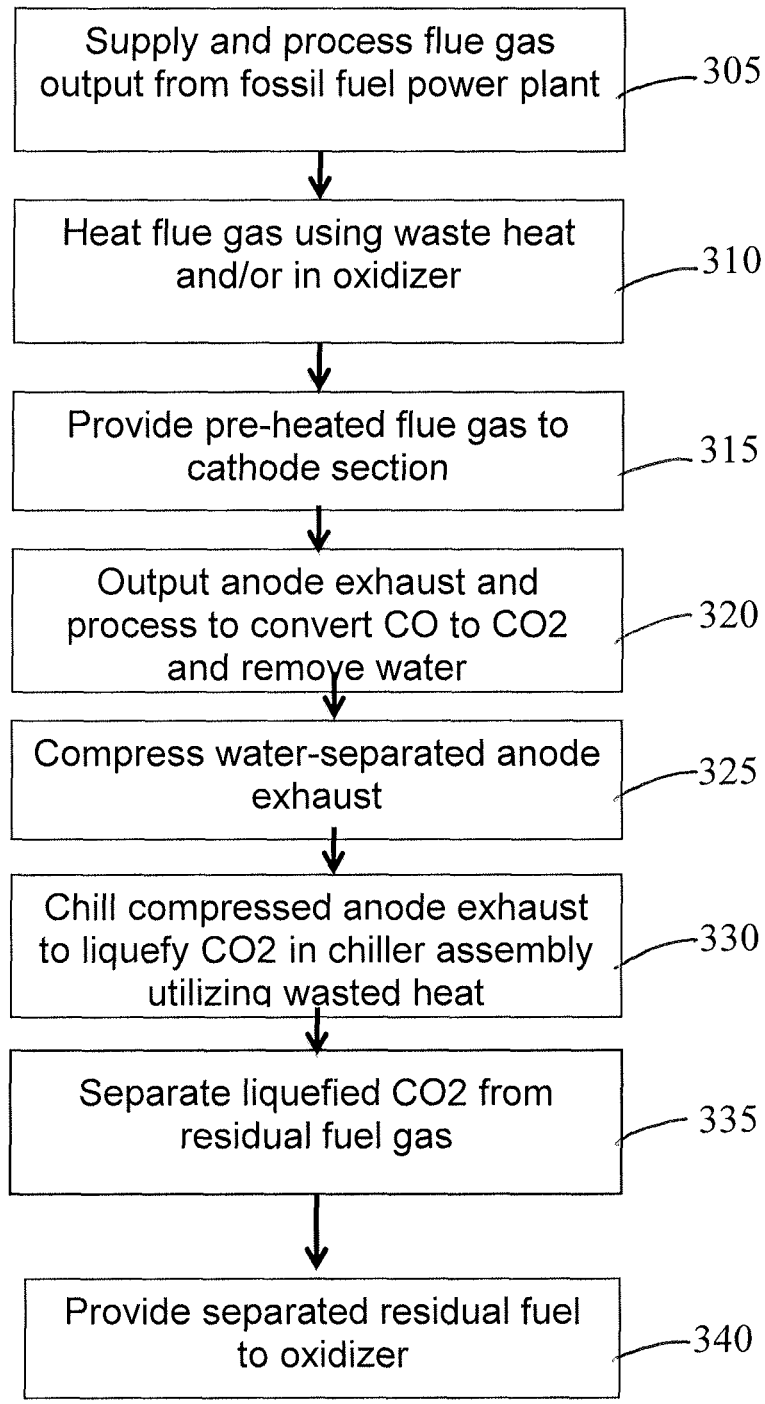
FIG. 3 shows a flow chart of a gas separation method for a power production system.

The operation of the system shown in FIG. 2 is illustrated in FIG. 3, which shows a flow chart of a gas separation method using the power producing gas separation and sequestration system of FIG. 2. In step 305 of FIG. 3, flue gas produced by a combustion-based power plant and comprising carbon dioxide, water, oxygen and nitrogen, is supplied to the system, and may be processed to remove sulfur oxides and other trace species. In step 310, the flue gas supplied and processed in step 305 is heated in using waste heat from fuel cell cathode exhaust and/or by oxidizing fuel in the oxidizer. As discussed above with respect to FIG. 2, the fuel provided to the oxidizer may be separated hydrogen fuel from the fuel cell anode exhaust. In step 315, the pre-heated flue gas provided to the cathode section of a fuel cell, where the flue gas is used in an electrochemical reaction with hydrogen fuel to produce and output power. In step 320, anode exhaust including spent fuel, carbon dioxide, water and carbon monoxide is output from the anode section of the fuel cell and processed to convert carbon monoxide to carbon dioxide in the shift reactor and to remove water from the anode exhaust using the water removal assembly. In step 325, water-separated anode exhaust produced in step 320 is provided to a carbon dioxide separation assembly where the anode exhaust is compressed to a predetermined pressure, such as 200 psi or higher. In the next step 330, the compressed anode exhaust is chilled or cooled in the chiller assembly to a predetermined temperature so as to cause carbon dioxide to liquefy while maintaining residual fuel (hydrogen) in gaseous state. As discussed above, the predetermined temperature is −40° C. or warmer depending on the compressor outlet pressure. In step 330, waste heat produced by the fuel cell is recovered from the cathode exhaust and utilized in the chiller assembly to drive the cooling/chilling operation. In Step 335, liquefied carbon dioxide is separated from the residual fuel gas in the gas separation device. The carbon dioxide separated by the gas separation in step 335 is substantially pure, and has a purity of at least 90%, and preferably of 99% or more. The separated carbon dioxide of high purity is suitable for transport, sequestration and/or use by other industries, such as Enhanced Oil Recovery (EOR). Finally, in step 340, the residual fuel separated from the anode exhaust in step 335 is provided to the oxidizer where it is oxidized and used to pre-heat incoming flue gas. The residual fuel or a portion of it may be used as a syngas in other processes outside of the gas separation system such as a boiler, a combustion turbine or a refinery.

The system and method shown in FIGS. 2 and 3 provide for efficient use of flue gas in a fuel cell system and separation of high-purity carbon dioxide and residual fuel from the anode exhaust. In particular, the separation of the carbon dioxide from the residual fuel in the anode exhaust is accomplished by use of absorption chillers to cool the anode exhaust to a temperature at which carbon dioxide becomes liquefied and can be easily separated from the residual fuel. The absorption chillers are commercially available devices which can be adapted for use with the fuel cell system, thereby resulting in manufacturing efficiencies. Moreover, as described above, the absorption chillers utilize waste heat produced by the fuel cell system, thus increasing the operating efficiency of the whole system, while also obtaining high-purity carbon dioxide suitable for sequestration and use in other industries.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

I claim:

1. A power producing system configured to utilize a flue gas output from a flue gas generating assembly, wherein the flue gas comprises carbon dioxide and oxygen and the power producing system comprises:
   a first heat exchanger configured to receive the flue gas output from the flue gas generating assembly, and adjust a temperature of the flue gas to be in a range of 500-650° C.;
   a fuel cell comprising an anode section and a cathode section, the cathode section of the fuel cell being configured to receive inlet oxidant gas that contains the flue gas output from the first heat exchanger; and
   a gas separation assembly configured to receive anode exhaust output from the anode section of the fuel cell and comprising:
      a chiller assembly configured to cool the anode exhaust to a predetermined temperature so as to liquefy carbon dioxide in the anode exhaust,
      a gas separation device configured to receive the anode exhaust cooled by the chiller assembly and separate the liquefied carbon dioxide from residual fuel gas, and
      a heat recovery assembly configured to recover waste heat from cathode exhaust output from the cathode section of the fuel cell,
      wherein the heat recovery assembly and the chiller assembly are configured such that said waste heat recovered by the heat recovery assembly is utilized to drive the chiller assembly; and
   an oxidizer configured to receive residual fuel gas separated by the gas separation device, receive temperature-adjusted flue gas directly from the first heat exchanger, oxidize the residual fuel gas to heat the flue gas, and output heated flue gas directly to the cathode section of the fuel cell.

2. The power producing system of claim 1, wherein the cathode section of the fuel cell is configured to receive inlet oxidant gas that consists of all or part of the flue gas output by the flue gas generating assembly.

3. The power producing system of claim 1, wherein the chiller assembly comprises one or more absorption chillers.

4. The power producing system of claim 1, wherein the gas separation assembly further comprises a water removal assembly configured to separate water from the anode exhaust and output water-separated anode exhaust, wherein the chiller assembly is configured to receive the water-separated anode exhaust.

5. The power producing system of claim 4, wherein the gas separation assembly further includes a compressor configured to compress the water-separated anode exhaust output from the water removal assembly prior to the water-separated anode exhaust being conveyed to the chiller assembly.

6. The power producing system of claim 4, wherein the gas separation assembly further includes a shift reactor configured to convert carbon monoxide in the anode exhaust to carbon dioxide prior to the anode exhaust being conveyed to the water removal assembly.

7. The power producing system of claim 1, wherein the first heat exchanger is configured to utilize waste heat in the cathode exhaust for heating the flue gas output by the flue gas generating assembly to the temperature in the range of 500-650° C.

8. The power producing system of claim 5, wherein the compressor is configured to compress the anode exhaust to at least 200 psi and wherein the chiller assembly is configured to chill the anode exhaust to −40° C. or warmer based on the compressor outlet pressure.

9. The power producing system of claim 1, wherein the fuel cell is an internal reforming Molten Carbonate Fuel Cell (MCFC).

10. The power producing system of claim 1, further comprising said flue gas generating assembly.

11. The power producing system of claim 1, wherein the gas separation device comprises a flash drum.

12. The power production system of claim 10, wherein the cathode section of the fuel cell is configured to receive inlet oxidant gas that exclusively consists of all or part of the flue gas output by the flue gas generating assembly.

13. The power producing system of claim 1, wherein the flue gas generating assembly is selected from the group consisting of (i) a fossil-fueled flue gas generating assembly, (ii) a boiler, (iii) a combustor, and (iv) a furnace and a kiln of a cement factory.

14. The power producing system of claim 1, further comprising a second heat exchanger configured to utilize waste heat in the cathode exhaust for heating fuel gas to be input to the anode section.

15. A gas separation method for use in a power producing system utilizing a flue gas output from a flue gas generating assembly, wherein the flue gas comprises carbon dioxide and oxygen and the method comprises:
   receiving the flue gas output from the flue gas generating assembly at a first heat exchanger;
   using the first heat exchanger to adjust a temperature of the flue gas to be in a range of 500-650° C.;
   outputting the temperature-adjusted flue gas from the first heat exchanger directly to an oxidizer;
   operating a fuel cell having an anode section and the cathode section, wherein anode exhaust is output from the anode section of the fuel cell during operating of the fuel cell;
   recovering waste heat from cathode exhaust output from the cathode section of the fuel cell;
   cooling the anode exhaust to a predetermined temperature in a chiller assembly so as to liquefy the carbon dioxide in the anode exhaust while utilizing the waste heat from the cathode exhaust to drive the chiller assembly; and
   after cooling the anode exhaust in the chiller assembly, separating the liquefied carbon dioxide from residual fuel gas in a gas separation device;
   wherein the oxidizer receives residual fuel gas separated in the separating step and the temperature-adjusted flue gas from the first heat exchanger, oxidizes the residual fuel gas to heat the flue gas, and outputs heated flue gas directly to the cathode section of the fuel cell.

16. The gas separation method of claim 15, wherein all or part of the flue gas output by the flue gas generating assembly is provided to the cathode section of the fuel cell exclusively as the inlet oxidant gas.

17. The gas separation method of claim 15, wherein the chiller assembly comprises one or more absorption chillers.

18. The gas separation method of claim 15, further comprising separating water from the anode exhaust and outputting water-separated anode exhaust prior to separating the carbon dioxide and the residual fuel in the anode exhaust.

19. The gas separation method of claim 18, further comprising compressing water-separated anode exhaust prior to separating the carbon dioxide and the residual fuel in the anode exhaust.

20. The gas separation method of claim 19, further comprising converting carbon monoxide in the anode exhaust to carbon dioxide prior to separating water from the anode exhaust.

21. The gas separation method of claim 15, wherein the first heat exchanger utilizes waste heat recovered from the cathode exhaust for heating the flue gas output by the flue gas generating assembly to the temperature in the range of 500-650° C.

22. The gas separation method of claim 19, wherein said compressing comprises compressing the water-separated anode exhaust to at least 200 psi and wherein the predetermined temperature is −40° C. or warmer.

23. The gas separation method of claim 15, wherein the flue gas generating assembly is a fossil-fueled flue gas generating assembly.

24. The gas separation method of claim 15, wherein the flue gas generating assembly is a boiler.

25. The gas separation method of claim 15, wherein the flue gas generating assembly is a combustor.

26. The gas separation method of claim 15, wherein the flue gas generating assembly comprises a furnace and a kiln of a cement factory.

27. The gas separation method of claim 15, wherein the carbon dioxide obtained from the step of separating carbon dioxide and residual fuel in the anode exhaust has a purity of at least 90%.

28. The gas separation method of claim 27, wherein the carbon dioxide obtained from the step of separating carbon dioxide and residual fuel in the anode exhaust has a purity of at least 99%.

29. The gas separation method of claim 27, wherein the liquid carbon dioxide obtained from the step of separating carbon dioxide and residual fuel in the anode exhaust is suitable for storage in a storage medium.

30. The gas separation method of claim 27, wherein the liquid carbon dioxide obtained from the step of separating carbon dioxide and residual fuel in the anode exhaust is suitable for use in enhanced oil recovery.

31. The gas separation method of claim 27, wherein the liquid carbon dioxide obtained from the step of separating carbon dioxide and residual fuel in the anode exhaust is suitable for use in the food industry.

32. The gas separation method of claim 15, further comprising, in a second heat exchanger, utilizing waste heat recovered from the cathode exhaust for heating fuel gas to be input to the anode section of the fuel cell in a second heat exchanger.

* * * * *